United States Patent
Park et al.

(10) Patent No.: US 7,900,026 B2
(45) Date of Patent: Mar. 1, 2011

(54) TARGET BRANCH PREDICTION USING A PLURALITY OF TABLES

(75) Inventors: Il Park, White Plains, NY (US); Mauricio J. Serrano, Bronx, NY (US); Jong-Deok Choi, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 46 days.

(21) Appl. No.: 12/246,282

(22) Filed: Oct. 6, 2008

(65) Prior Publication Data

US 2009/0037708 A1    Feb. 5, 2009

Related U.S. Application Data

(63) Continuation of application No. 11/399,979, filed on Apr. 7, 2006, now Pat. No. 7,434,037.

(51) Int. Cl.
*G06F 9/32* (2006.01)

(52) U.S. Cl. ...................... 712/239; 712/240

(58) Field of Classification Search .......... 712/237–240
See application file for complete search history.

(56) References Cited

U.S. PATENT DOCUMENTS

| | | | |
|---|---|---|---|
| 5,758,142 A * | 5/1998 | McFarling et al. | 712/239 |
| 2003/0212882 A1* | 11/2003 | Bonanno et al. | 712/238 |
| 2004/0215720 A1* | 10/2004 | Alexander et al. | 709/204 |

* cited by examiner

*Primary Examiner*—Richard Ellis

(74) *Attorney, Agent, or Firm*—Michael J. Buchenhorner; Derek S. Jennings

(57) ABSTRACT

A system for predicting multiple targets for a single branch includes: a branch target buffer that includes a previous next address for an instruction and that receives an indirect instruction address to provide a first branch target prediction; a first branch table for capturing local past target information of an indirect branch in an encoded form; a second branch table which is a correlation table for storing potential branch targets based on a local branch history and which provides a second branch target prediction when the first branch target prediction is not successful; an exclusion predictor for inhibiting updates of inefficient entries; and a multiplexer to select the predicted target as output.

21 Claims, 3 Drawing Sheets

TARGET BRANCH PREDICTION USING A PLURALITY OF TABLES

CROSS-REFERENCE TO RELATED APPLICATIONS

This application is a continuation of commonly-owned, co-pending U.S. patent application Ser. No. 11/399,979, filed on Apr. 7, 2006, which application is incorporated by reference as if fully set forth herein.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information processing systems, and more particularly relates to the field of microprocessors and more specifically to instruction branch predictor architectures.

BACKGROUND OF THE INVENTION

A branch instruction is an instruction that switches the system CPU (central processing unit) to another location in memory. A branch prediction is a prediction of the outcome of a branch instruction such that the system prefetches those instructions and executes them in parallel with the current instructions. If the prediction is wrong the system must waste processing cycles fetching the correct instruction.

The basic dataflow for an instruction is: instruction fetch, decode, cache access, execute, and result write back. Instructions enter the pipeline in program order. Any delay in instruction fetch adds latency and so hurts the performance.

Branch target prediction is employed in many processors to predict the target of an indirect branch. An indirect branch is a branch whose target is computed at run-time. A common example of an instruction sequence using an indirect branch is an instruction loading a register from a table, followed by the branch using the target stored in the register. Many high-level programming languages employ indirect branches. For example, in object-oriented languages such as Java, C++, and C#, indirect branches can be used for virtual function calls, where the target of a branch is obtained from a set of potential targets by examining the content of an object. Another example is the C/C++/Java switch statement, where the target could be obtained from a table indexed by the value in the statement. There is a need for predicting targets that may be employed in situations where a given branch has multiple targets, and/or subroutine returns and many branches with computed targets.

SUMMARY OF THE INVENTION

Briefly according to an embodiment of the invention, an information processing system for predicting multiple targets for a single branch includes the following: a branch target buffer (BTB) including the previous next address for an instruction; a first branch table for capturing local past target information of an indirect branch; a second branch table for storing potential branch targets based on a local branch history; an exclusion predictor for inhibiting the update of inefficient entries; and a multiplexer to select the predicted target for presenting as output.

The method can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
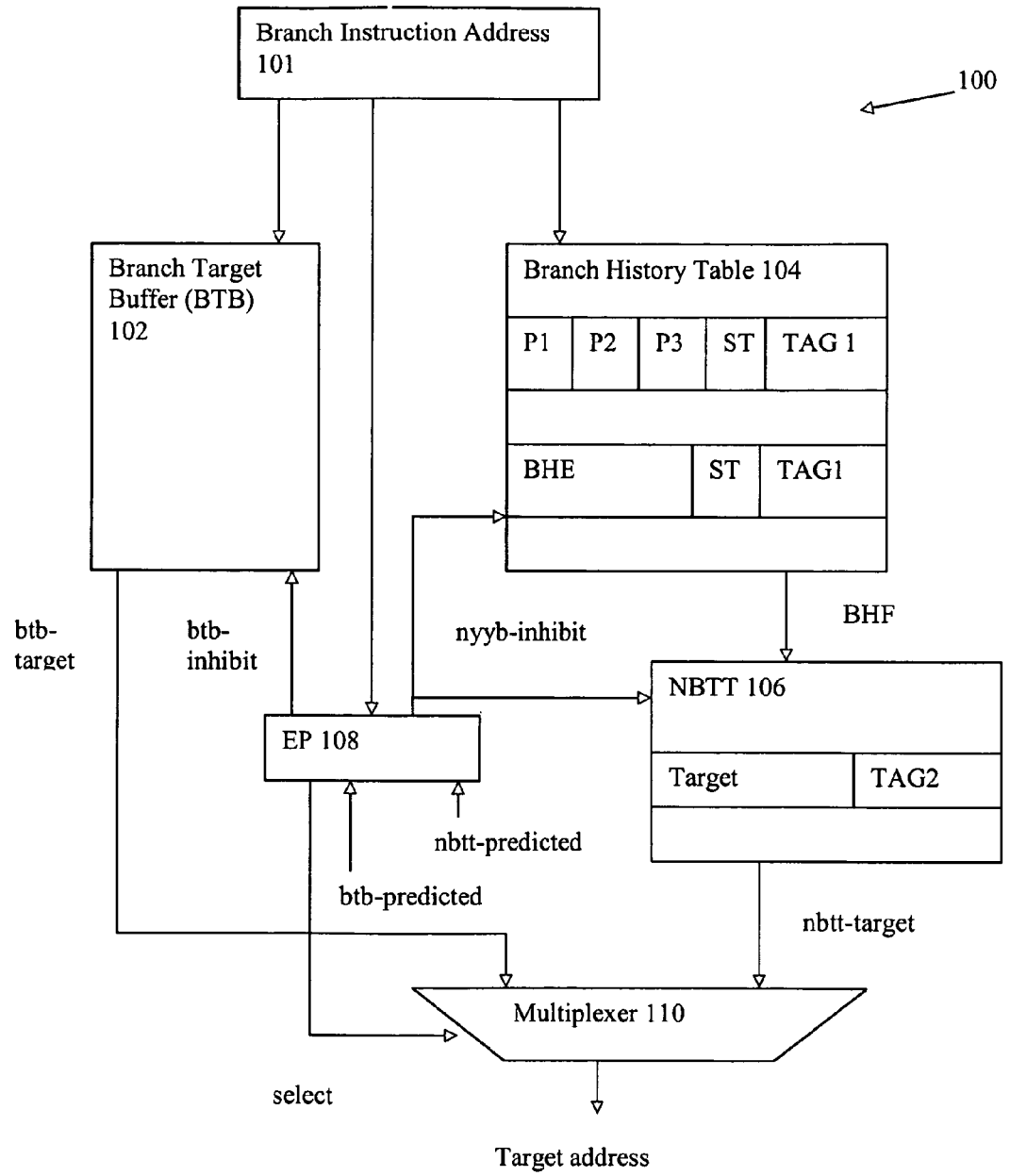
FIG. 1 is a general interconnection diagram of a preferred embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Referring to FIG. 1, an embodiment of the invention is shown. According to this embodiment, hardware for target branch prediction can be implemented in current processor designs. An apparatus 100 predicts multiple targets for a single branch using a plurality tables to enhance an existing predictor branch target buffer (BTB) 102, described in prior art. A branch history table (BHT) 104 is used to capture local past target information 101 of an indirect branch in an efficient way.

We introduce a Branch Hashing Function (BHF) used to index a Next Branch Target Table (NBTT) 106 which will predict the next target of a branch. Finally, we use an exclusion predictor table (EP) 108 which keeps track of prediction accuracy and inhibits updating some of the tables based on prediction effectiveness. Inhibiting update of ineffective entries in the table prevents premature aging and eviction of effective entries due to ineffective ones. The EP table 108 is used to further enhance the efficiency of storing entries in the tables, thus making it possible to have the same prediction accuracy with smaller tables than comparable tables with more entries. In another embodiment, the EP table 108 can be embedded into an existing predictor, to further reduce circuit complexity. The system includes a multiplexer 110 activated by the EP 108 to select the output, a predicted target, to present at the output of the system The outputs can be the BTB target or the NBTT target.

The system 100 enhances the performance of existing systems by adding extra circuitry to be used for cases where a branch can be predicted with local history information. The system 100 can make a decision as to whether to employ an existing predictor (the BTB 102) to predict some branches, or to employ an alternate prediction mechanism to predict a branch falling into the scope of the system 100. Furthermore, the system 100 can better manage resources by dynamically selecting the best resource appropriate for a particular branch. This has the effect of employing fewer resources for a particular branch, thus reducing sources of conflict caused by limited table sizes, and the like.

A first embodiment exploits the local history of an indirect branch to make a prediction of the most likely target of a branch. The local branch history is the history of the targets taken by a branch. For example, the branch B1 may have the following history: B1={A1, A2, A3, A4, A5 . . . }. Thus, the branch B1 has successive targets A1, A2, A3, A4, A5, and so on. It is often possible to predict the next target of a branch based on its previous history. For example if the history of the branch is B2={A1, A2, A3, A1, A2, A3 . . . } then the next target of the branch B2 can be predicted by examining the previous target of a branch. Thus, if the previous target is A2 we can make a prediction that the next target will be A3, if the previous target is A3 we can predict A1, and so on. In another example, the branch B3 may have the history B3={A1, A1, A2, A2, A3, A1, A1, A2, A2, A3, A1 . . . }. Thus, we can only predict A2 if we examine the last two previous targets {A1, A1} because the target A1 may be followed by either A1 or A2. In our final example, the branch B4 may have the history B4={A1, A1, A1, A1, . . . }, thus we can always predict the next target as the same previous target. To efficiently exploit hardware resources, our method learns how to recognize these cases by employing separate predictors for different branches, according to branch characteristics.

Our method uses the NBTT 106 which is a correlation table storing the potential branch targets, based on the history of the branch. In this embodiment, the NBTT table 106 implements a state machine, where the table index represents the current state of the branch, and the content of the table at that index represents the future state of the branch, or next target. FIG. 1 shows an example of an NBTT 106, where the index into the table is obtained by the combination of several branch characteristics, for example: the past local target history and the current program counter. We can also include a thread identification which could be useful in simultaneous multi-processor (SMT) processors running several threads simultaneously. For example, if two SMT threads are supported, we could add one bit to identify a thread.

Figure 2:
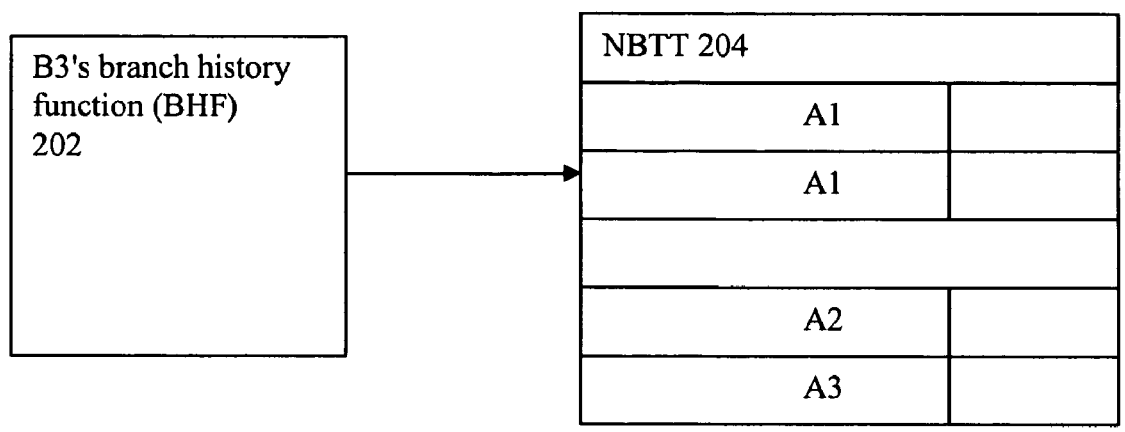
FIG. 2 is a high level block diagram showing an NBTT for the example B3={A1, A1, A2, A3, A1, A1, A2, A3, A1, ... }.

FIG. 2 illustrates how the content of an NBTT 204 table can predict the branch target for our previous example of the branch B3 202. The table predicts the target A1 in two contexts: when the most recent past local history is {A3, A1}, or when the most recent history is {A2, A3}. In the former, the BHT 104 has an entry with a matching branch history of {A3, A1}. The branch hashing function (BHF), applied to this entry, generates the index into NBTT 106 that contains A1 as the branch target.

Similarly, in the latter, there exists another entry in the BHT 104 for {A1, A1} that, when applied to the BHF, generates the index into NBTT with A1 as the branch target. Similarly, the table predicts A2 for the history {A1, A1}, and A3 for the history {A1, A2}. The table NBTT 106 can be further optimized for space by replacing the target address with an index into a second table. Thus, for the example, instead of storing two A1 branch targets, we can store two smaller indices into NBTT 106 and an index into an additional table which will contain only one entry for the target A1.

The BHT 104 stores a local branch history for the past N targets of a branch in an encoded form. FIG. 1 illustrates a history table which stores the last three targets of a branch, indexed by a branch address. P1 maintains bits for the most recent branch target, P2 for the next older target, and P3 for the oldest target. Not all the bits of a target are stored, therefore |P1|<|target size|. Similarly, older targets may require less information. There is also a state machine using ST bits to keep track of replacement policies, in case the table is associatively indexed, as understood in well-known prior art. Finally, there is an optional matching TAG1, TAG2, TAG3, . . . used to improve matching accuracy, by finding whether the particular entry matches the program counter (PC) used to index the entry, although it does not need to match all the bits of the PC.

Upon a new target outcome, some of the bits of the branch target (BT) are copied into P1, some of the bits in P1 are copied into P2, and some of the bits in P2 are copied into P3. We do not need as many bits for older targets as for newer targets, therefore |P3|<|P2|<|P1|<|BT|. Typically, a few low order bits can be used to keep track of the P1 branch target, for example by taking the low-order 9 bits of a branch address and dropping the 2 low-order bits, for a total storage of 7 bits. Fewer bits are required for P2 and P3, for example 4 and 1, respectively.

In another embodiment a novel method efficiently computes a branch history function which will be used to index the NBTT 106 table. The method computes the branch history function (BHF) as follows, where A+B is the XOR function between operands A and B, and P<<SH is the binary shift left operator of operand P by a number of bits SH. The binary shift right operand is >>. Only a number of resulting bits are used to index into the NBTT:

$$BHF=(PC>>p)+(P1)+(P2<<SH2)+(P3<<SH3)$$

Figure 3:
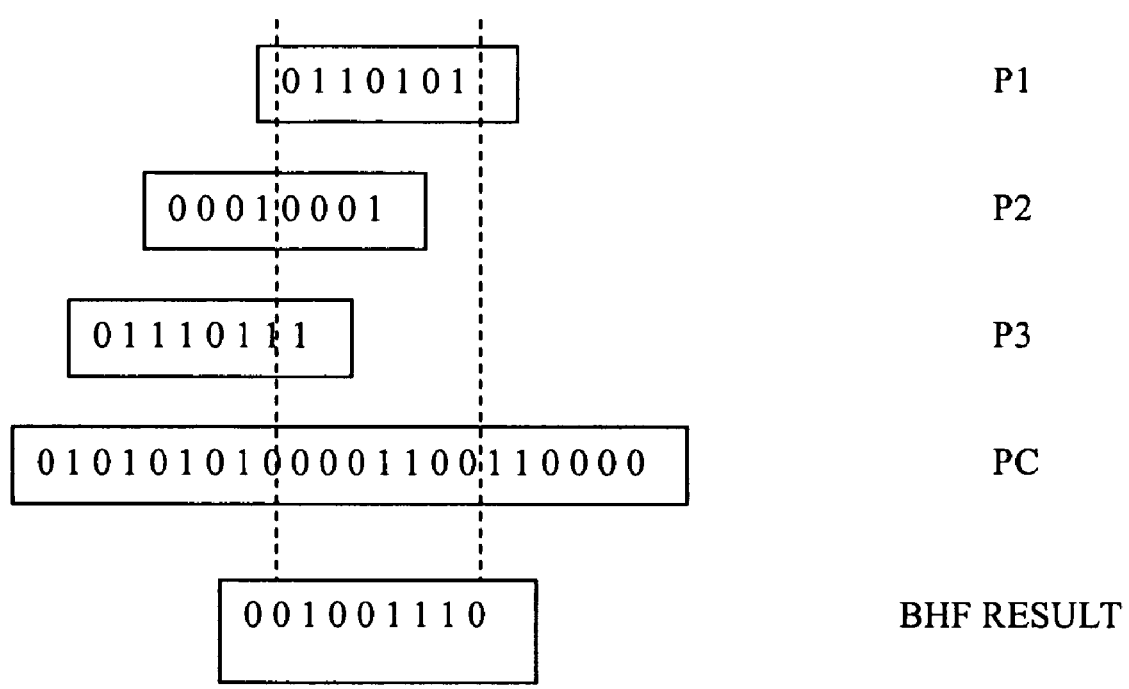
FIG. 3 is an example of computing a branch history function (BHF).

In other words, our BHF combines several bits of the past targets of a branch, giving less importance to older histories. Graphically, this can be illustrated with the following example:

For FIG. 3, the BHF is computed as $$(PC>>4)+(P1)+(P2<<3)+(P3<<6).$$

An alternative way to store more concise past history in the BHT can be accomplished if the shift amounts given in the previous formula are always proportional to the age of the target; in our example, 3 and 6 for targets P2 and P3.

Therefore, it is not necessary to explicitly store the past targets for a branch, but rather the BHE (Branch History Entry) will contain the hashing of P1, P2, and P3. The branch history will be computed from the BHE, and the BHE will be updated to reflect the new target of the branch (BT):BHF=(PC>>p)+(BHE) (performed prior to accessing NBTT)

BHE=(BHE<<SH)+BT (performed after the target is known).

The BHF function will produce a hashing function used to index the NBTT table, using a few bits obtained from the result, as shown in FIG. 1. An optional TAG2 stored in the indexed entry in the NBTT 104 can be used to improve the accuracy of the matching process, by comparing the tag to some extra bits produced by the BHF function which were not used in the index process. The result of the NBTT 106 will be a target address predicted for a particular branch.

We combine a) dynamically predicting the best resource appropriate for a particular branch, and b) selectively inhibiting table updates for predictors whose prediction accuracy has not been high enough. Prior art using hybrid predictors only considered the case of selecting the most appropriate predictor for a branch. We use an exclusion predictor (EP) 108 which inhibits updating information into a table, if the predictor performs poorly; this has the effect of employing fewer resources for a particular branch, thus reducing sources of conflict caused by limited table sizes, and so forth.

An important observation is that EP 108 will not try to flush existing entries from the tables when a predictor performs poorly, which is typically a very expensive operation since it involves searching in the table. Rather EP 108 will inhibit updating the normal process of entry updating employed in many table schemes, which will naturally age some entries and eventually will replace old entries with newer, more predictable entries. An example of replacement schemes are: a) for direct mapped tables, replacement of an entry at the same index, b) for set-associative mapped tables, replacement of an entry using a scheme such as LRU (least-recently used) or similar schemes.

The EP 108 receives two binary inputs, as illustrated in FIG. 1: the accuracy of prediction via a BTB predictor (btb_predicted) and the accuracy of prediction via our novel predictor (NBTT_predicted); a value of 1 in an input will indicate a correct prediction, while a value of 0 will indicate an incorrect prediction. One output of EP 108 will be the select signal to choose one predicted target (select) which will be 0 for the existing predictor, and 1 for the NBTT predictor. Other outputs are the inhibit signals for both predictors (btb_inhibit, NBTT_inhibit) which will be 1 for inhibit and 0 for normal operation.

In another embodiment, we use a confidence table, which will be accessed by indirect branches. Each entry in the confidence table has a counter, whose value varies from zero to N. Typically, this is implemented as a binary saturating counter. For example, if we used a 3-bit saturating counter, the possible values of the counter are [0, 1, 2, 3, 4, 5, 6, 7].

When a program or a thread starts, each value in the confidence table can be initialized to a predefined value (i.e., to zero). The output of the counter can be used to decide the course of action. A low value of the counter will indicate that the BTB predictor performs better, thus the select output will be 0. Conversely, a high value will indicate that the NBTT predictor performs better, thus the select output will be 1. A very low value of the counter can be used to indicate that it is better to use the BTB predictor, thus the btb_inhibit and NBTT_inhibit outputs will be 0 and 1, respectively. Conversely, a very high value of the counter can be used to indicate that it is better to use the NBTT predictor, thus the btb_inhibit and NBTT_inhibit outputs will be 1 and 0, respectively. In any other case, these two outputs will be both 0.

Table 1 illustrates the possible states that the counter in the confidence table represents. As an example, we present the case of having four states (S0, S1, S2, S3). The table shows how the count values represent the different states and what to do depending on the relevant state. The first row shows what to update when a branch commits. For instance, if the counter value relevant to the current branch is within a range between zero and $F1(N)-1$, we are going to update BTB only. If the value is within a range between $F1(N)$ and $F2(N)-1$, we are going to update both BTB and NBTT. As an example, we can define $Fm(N)$ as $m*N/4$.

TABLE 1

How to use the counter value of the confidence table.

| States | S0 | S1 | S2 | S3 |
|---|---|---|---|---|
| Counter Values | $0 \ldots F1(N)-1$ | $F1(N) \ldots F2(N)-1$ | $F2(N) \ldots F3(N)-1$ | $F3(N) \ldots N$ |
| What to update | Update BTB | Update BTB Update NBTT | Update BTB Update NBTT | Update NBTT |
| What to use | Use BTB | Use BTB | Use NBTT | Use NBTT |

If only BTB 102 (or NBTT 106) has a tag-matched entry, the outcome from BTB 102 (or NBTT 106) will be used without consulting the counter value in the confidence table. If both BTB 102 and NBTT 106 have a tag-matched entry, deciding which outcome should be used as a predicted value can affect the target prediction accuracy.

The second row in the table illustrates which predictor should be used, only when both BTB and NBTT have a tag-matched entry and generate a target prediction. If the counter value belongs to S0 (or to S3), then we can assume that BTB 102 (or NBTT 106) has very high confidence in predicting a target for the current branch. Hence, we are going to use the result from BTB 102 (or NBTT 106). If the counter value belongs to S2 (or to S3), we can use the result from BTB 102 (or NBTT 106) even though we update both BTB 102 and NBTT 106 at the current state. This table shows only one exemplary case of our invention. In a real implementation, the contents of this table can be extended or simplified. For example, we can merge S2 and S3, or we can delete one of the states above.

Now, we explain how to change the counter value and so the state of each branch. The following table shows an exemplary case of how to update the counter in the table depending on the various conditions of BTB 102 and NBTT 106. The basic idea that this table tries to implement here is following:

1. Push the state into the direction of S0 if BTB 102 works well.
2. Push the state into the direction of S3 if BTB 102 fails because the current branch clearly has multiple targets.
3. Push the state into the middle, so both BTB 102 and NBTT 106 can be updated if the situation is fuzzy (unclear).

TABLE 2

How to update the states in the confidence table.

| BTB | NBTT | What to do |
|---|---|---|
| Tag Match: Target Hit | Don't care | Move to the direction of S0 by decrementing the counter |
| Target Miss | Don't care | Move to the direction of S3 by incrementing the counter |
| Tag Mismatch | Target Hit | Do not change |
| | Target Miss | Go to S1 |
| | Tag Mismatch | Go to S1 if the current state is S2 or S3 Otherwise, do not change. |

Again, these two tables only illustrate one possible exemplary case of an embodiment of the invention. The functions and methods presented here should not limit the scope of this invention.

Therefore, while there has been described what is presently considered to be the preferred embodiment, it will understood

We claim:

1. An information processing system, comprising:
   an indirect branch instruction address received as input by a branch target buffer and a branch history table;
   the branch target buffer comprising a last next address for the indirect branch instruction and for providing a first predicted branch target address for the indirect branch instruction;
   the branch history table comprising local past target information of the indirect branch instruction and indexed by branch addresses;
   a next branch target table operatively coupled with the branch history table, said next branch target table comprising potential branch targets based on a branch history of previous branches and providing a second predicted branch target address;
   an exclusion table predictor operatively coupled with both the branch target buffer and the branch history table for keeping track of prediction accuracy of both, wherein said exclusion table predictor inhibits update of inefficient entries in both the branch target buffer and the next branch target table; and
   a multiplexer for:
      receiving the first predicted branch target address from the branch target buffer;
      receiving the second predicted branch target address from the next branch target table;
      receiving a select signal from the exclusion table predictor for selecting which of the predicted branch target addresses to provide as an output; and
      providing the selected predicted branch target address.

2. The information processing system of claim 1, further comprising a second branch history table for storing a local branch history for a past N target addresses, including an oldest target address and a series of target addresses decreasing in age.

3. The information processing system of claim 2, wherein the exclusion predictor is embedded into the second branch history table.

4. The information processing system of claim 2 further comprising a state machine implemented by the second branch history table, said state machine comprising a table index that represents a current state of a branch and a content of the table that represents a future state of the branch.

5. The information processing system of claim 1 further comprising a branch hashing function performed by the branch history table for accessing the second predicted branch target address from the next branch target table.

6. The information processing system of claim 5 wherein the branch hashing function is implemented as a weighted function combining several bits of past targets of a branch, giving less weight to older branch histories.

7. The information processing system of claim 1 further comprising a state machine implemented by the next branch target table with a table index that represents a current state of a branch and the content of the table at the index represents a future state of the branch.

8. The information processing system of claim 1, further comprising a thread identification for running several threads simultaneously.

9. The information processing system of claim 1, wherein the exclusion table predictor is embedded into an existing predictor.

10. The information processing system of claim 1, wherein the exclusion predictor is embedded into the branch history table.

11. The information processing system of claim 1, further comprising a thread identification for running several threads simultaneously.

12. The information processing system of claim 1, further comprising a confidence table that is accessed by indirect branches, wherein each entry in said confidence table comprises a counter whose value varies from zero to N, wherein N represents a number of past targets.

13. The information processing system of claim 1 wherein the confidence table counter is implemented as a binary saturating counter.

14. An exclusion predictor comprising:
   an input for receiving from a plurality of branch prediction resources:
      a first branch target address prediction from a branch target buffer; and
      a second branch target address prediction from a next branch target table;
   a predictor for determining prediction accuracy of the branch prediction resources; and
   an output for:
      generating a signal to a multiplexer to select a best predictor; and
      sending inhibit signals to the branch prediction resources for inhibiting a table update of the branch prediction resource whose prediction accuracy does not meet a threshold, wherein said inhibiting does not cause a flush of existing inaccurate entries.

15. The exclusion predictor of claim 14 wherein the predictor comprises a confidence table and wherein each entry in the confidence table has an associated counter.

16. The exclusion predictor of claim 15 wherein each counter comprises a value that varies from zero to N.

17. The exclusion predictor of claim 16 wherein each counter is implemented as a binary saturating counter.

18. The exclusion predictor of claim 15 wherein each value in the confidence table is initialized to a predefined value when a thread starts.

19. The exclusion predictor of claim 18 wherein a low value of the counter indicates that the first branch target address prediction is more accurate; and a high value of the counter indicates that the second branch target address prediction is more accurate.

20. The exclusion predictor of claim 14 wherein the input is a binary input.

21. The exclusion predictor of claim 14 wherein updating the table entries comprises using a replacement scheme.

* * * * *